United States Patent [19]

Blose

[11] 4,244,607
[45] Jan. 13, 1981

[54] CYLINDRICAL THREADED CONNECTION

[75] Inventor: Thomas L. Blose, Houston, Tex.

[73] Assignee: Hydril Company, Los Angeles, Calif.

[21] Appl. No.: 449

[22] Filed: Jan. 2, 1979

[51] Int. Cl.³ .............................................. F16L 21/00
[52] U.S. Cl. ..................................... 285/92; 285/334; 411/265
[58] Field of Search ............... 285/334, 333, 390, 355, 285/92; 151/14 R, 22

[56] References Cited

U.S. PATENT DOCUMENTS

| 1,932,427 | 10/1933 | Stone ...................................... 285/334 |
| 2,239,942 | 4/1941 | Stone et al. ........................ 285/334 X |
| 3,359,013 | 12/1967 | Knox et al. ......................... 285/334 X |
| 3,994,516 | 11/1976 | Fredd ................................. 285/333 X |
| 4,026,583 | 5/1977 | Gottlieb ............................. 285/334 X |
| 4,085,951 | 4/1978 | Morris ............................... 285/355 X |
| 4,113,290 | 9/1978 | Miida .................................. 285/334 |

Primary Examiner—Thomas F. Callaghan
Attorney, Agent, or Firm—Pravel, Gambrell, Hewitt, Kirk, Kimball & Dodge

[57] ABSTRACT

A cylindrical threaded connector is provided with a small amount of taper to produce a controlled radial interference to prevent inadvertent thread disengagement. The threaded connector is especially suited for use with radial clearance cylindrical threads subjected to tension load such as tubular goods used in wells. The taper can be used on either or both threads of two step cylindrical threads.

13 Claims, 3 Drawing Figures

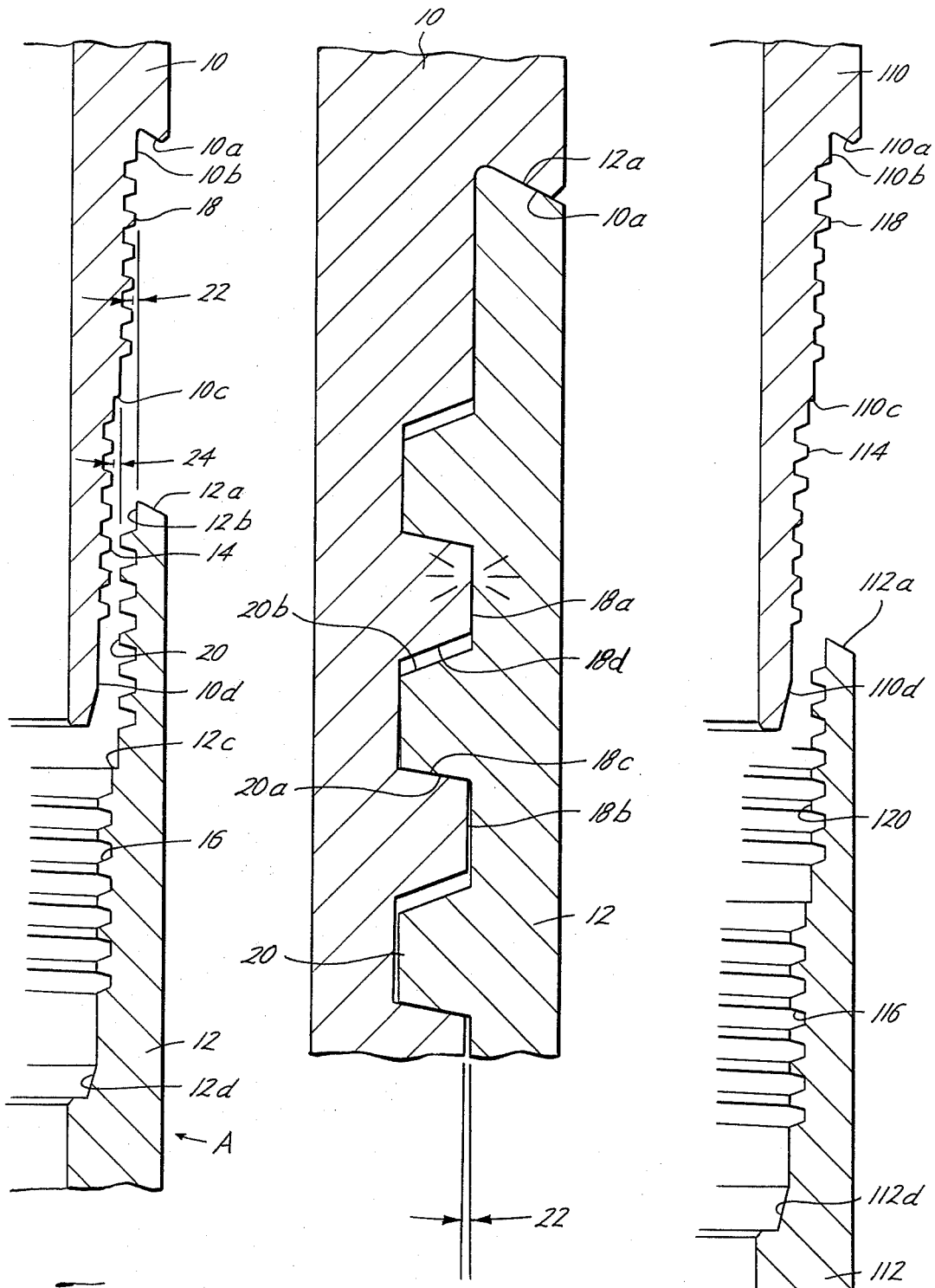

CYLINDRICAL THREADED CONNECTION

TECHNICAL FIELD

This invention relates to cylindrical threaded connections and particularly to cylindrical threaded connections for tubular goods used in wells.

BACKGROUND ART

Thread connections for oil field tubular goods have been either of the tapered or cylindrical thread type. The tapered threaded connections generally deform the interengaged threads on make-up which creates a radial interference in the connection to resist inadvertent disengagement of the threads. Cylindrical threads are often provided with free running radial clearance threads, usually in two steps, which enabled repeated make-up of the thread connectors using torque make-up shoulders without deforming the threads and which substantially eliminate the radial interference induced hoop stress. Examples of such cylindrical thread connectors are disclosed in U.S. Pat. Nos. 2,907,589 and 2,992,019, along with others, which are assigned to the assignee of the present invention.

When the radial clearance cylindrical thread connectors are subjected to tensile loading, there appears to be a reduction in the "break out" torque needed to separate the pin and box members. This loss or reduction in break out torque may enable inadvertent separation of the connection as a result of well conditions such as vibration and could result in tubing leak, dropping the string or a well blowout.

DISCLOSURE OF THE INVENTION

This invention relates to thread connectors and particularly to tubular helical thread connections for use in wells.

A radial clearance type helical thread connector, preferably a two-step cylindrical thread connector, is provided with a controlled amount of radial interference to increase "break out" torque. Preferably, the pin is used to create the radial interference by either a slight continuous taper or a short steep taper on one or both thread steps.

BRIEF DESCRIPTION OF THE DRAWINGS

FIG. 1 is a side view, in section, of a first embodiment of the present invention prior to make-up;

FIG. 2 is a side view, in section, of a made up connection with the controlled radial interference; and FIG. 3 is a view similar to FIG. 1 of another embodiment of the present invention.

BEST MODE FOR CARRYING OUT THE INVENTION

A first embodiment of the improved cylindrical threaded connection apparatus of the present invention, generally designated A, is illustrated prior to connection in FIG. 1. The threaded connection serves to secure a tubular pin member 10 to a tubular box member 12, both of which are formed on pipe upsets in the known manner. The pin member 10 has a first helical cylindrical thread 14 formed thereon which rotatably interengages a corresponding helical cylindrical thread 16 formed on the box member 12. The connection apparatus A is preferably of the two step thread construction and a second helical cylindrical thread 18 is provided on a greater diameter portion of pin 10 for engaging the second or upper helical cylindrical thread 20 of the box 12. The cylindrical threads 14, 16, 18 and 20 are preferably single pitch and when fully stabbed can be rotated a number of revolutions for interengaging the first set of threads 14 and 16 and the second set of threads 18 and 20 in the usual manner.

Formed on the pin member 10 above the thread 18 is a downwardly facing annular torque or stop shoulder 10a which is adapted to engage an upwardly facing annular torque or stop shoulder 12a of the box 12 to limit rotatable make-up of the threads 14, 16, 18 and 20. By seating on torque shoulders 10a and 12a, a positive stop is provided which has a high torque loading capacity.

To prevent leakage of fluid between the pin member 10 and box member 12 when in the made up condition, one or more seals are provided in the usual manner. Formed on the pin member 10 is a sealing surface 10b between the stop shoulder 10a and the upper thread 18. A suitable seal surface 10c may be provided between the spaced threads 14 and 18. A third sealing surface 10d may be provided on the pin member 10 below the first or lower thread 14. The sealing surface 10d may be spaced sufficiently from the lower helical thread 14 to be responsive to fluid pressure within the tubular pin 10 to be pressure energized as is disclosed in U.S. Pat. No. 2,992,019. A seal surface 12b on the box 12 would sealingly engage with the upper seal 10b when the connection A is in the made up condition. Intermediate seal surface 10c of the pin 10 would sealingly engage a seal surface 12c formed on the box 12 between threads 16 and 20. The sealing surface 10d would sealingly engage the tapered sealing surface 12d of the box member in the usual manner.

Such tubular thread connection apparatus as previously described is well-known to those of ordinary skill in the art. The threads are usually provided with radial clearance to be free running and the avoidance of inducing connection weakening hoop stresses from radial interference. In accordance with the present invention, one or more of the cylindrical threads are provided with sufficient taper to produce a controlled amount of radial interference between the pin 10 and box 12 to prevent inadvertent disengagement of the inner engaged helical cylindrical threads 14, 16, 18 and 20 that may occur after the apparatus A has been subject to tensile loading.

In the embodiment of FIG. 1 both the lower smaller diameter cylindrical thread 14 and the upper larger diameter cylindrical thread 18 have a small amount of taper to produce a controlled amount of radial interference between the pin member 10 and the box member 12 when connected. It is to be understood that this taper could be provided on either or both of the threads 14 and 18 without departing from the scope of the present invention. The angle of the taper of the upper thread 18 is illustrated at 22 while the taper of the lower thread 14 is illustrated at 24. This slight continuous taper for providing the radial interference extends for some predetermined axial distance along the threads 14, 18. When the apparatus A is made up, the uppermost helical turn or turns of the thread 18 which is designated 18a will create a radial interference with the box 12 while the lower helical turns indicated in FIG. 2 as 18b of the thread 18 will maintain radial clearance with the box 12. The load flank 18c of the helical thread 18 engages the load flank 20a of the helical thread 20 formed on the box in the usual manner. Clearance is also provided in the usual manner between the stabbing flank 20b of the thread 20 formed on the box and the stabbing flank 18d of the thread 18.

FIG. 3 illustrates a second embodiment of the present invention in a manner similar to that of FIG. 1 with the corresponding reference characters of FIG. 3 increased by one hundred corresponding to the identical aspects in the first embodiment. The significant difference between the embodiments of FIG. 1 and FIG. 3 is that the helical threads 114 and 118 formed on the pin member 120 is provided on a short but relatively steep taper to have two or more thread flights 114 and 118 that radially interfere with the box 112 to prevent the undesired inadvertent separation. Below the two top flights of threads 114 and 118 that provide the radial interference, the threads 114 and 118 are provided with radial clearance. It is of course understood that the short steep taper arrangement could be used on both threads 114 and 118 as illustrated or on only one of the two threads 114 or 118.

OPERATION

In the use and operation of the present invention the pin 10 is stabbed into the box 12 and rotated to interengage stop shoulders 10a and 12a. The taper of the pin threads 14 and 18 will cause the uppermost flight or flights to radially interfere with the box 12 a small but predetermined amount to increase the resistance to break-out torque, but not to weaken the connection. The made up connection A can be used for well drilling, production or remedial operations in the usual manner. During such operations the connection A will be subjected to tensile loading. The relative small amount of radial interference will resist inadvertent disengagement of the interengaged threads 14, 16 and 18, 20 despite the tensile loading. Such inadvertent disengagement could result in the development of a tubing leak or if sufficient thread area was not engaged could result in the box 12 being dropped from the pin 10. This would of course cause the well to blow out with serious consequences to life, property and environment. When it is desirable to break out the tubing the radial interference of the portion of the pin threads will provide resistance to break-out but will not be sufficient to hamper that operation.

The foregoing disclosure and description of the invention are illustrative and explanatory thereof and various changes in the size, shape and materials as well as in the details of the illustrated construction may be made without departing from the spirit of the invention.

I claim:

1. A thread connector for pin and box members, wherein:
   interengaged substantially free running radial clearance helical cylindrical threads on said pin member and said box member for rotatable make-up connect said pin member and said box member;
   stop shoulders on each of said pin member and said box member disposed adjacent said interengaged helical cylindrical thread for engagement to limit rotational make-up of said pin member and said box member;
   seal surface on each of said pin member and said box member disposed adjacent said interengaged threads for sealing radial interference engagement to block leakage of fluid between said pin member and said box member when said stop shoulders are engaged; and
   said thread on said pin member having a limited tapered portion relative to the longitudinal axis of the substantially free running radial clearance cylindrical thread to produce a controlled amount of radial interference engagement in the threads between said pin member and said box member to prevent inadvertent disengagement of the interengaged helical cylindrical threads.

2. The thread connector as set forth in claim 1, including:
   second interengaged substantially free running radial clearance helical cylindrical threads on said pin member and said box member for rotatable make-up with each other along with rotational make-up of said first mentioned interengaged threads of said pin member and said box member, said second interengaged threads longitudinally spaced on said pin member and said box member from said first mentioned interengaged threads.

3. The thread connector as set forth in claim 2, wherein:
   said second thread on said pin member having a limited tapered portion relative to the longitudinal axis to produce a controlled amount of radial interference between said pin member and said box member to prevent inadvertent disengagement of the interengaged helical cylindrical threads.

4. The thread connector as set forth in claim 2, wherein:
   said seal surfaces are disposed between said first interengaged threads and said second interengaged threads.

5. The thread connection as set forth in claim 1, wherein:
   said seal surfaces are spaced sufficiently from said interengaged threads for pressure equalization of said sealing engagement.

6. The threaded connection of claim 1, wherein:
   said box member and said pin member are tubular members.

7. A pin member adapted for connection with a box member, including:
   a pin member having a first helical cylindrical thread formed thereon for interengaging in a substantially free running radial clearance condition a corresponding helical cylindrical thread on a box member for releasably connecting said pin member with the box member;
   a stop shoulder formed on said pin member for engaging the box member to limit rotational make-up of said helical cylindrical thread with the box member;
   a sealing surface formed on said pin member adjacent said first helical cylindrical thread for sealing radial interference engagement with the box member when said stop shoulder engages the box member to block leakage of fluid between said pin member and the box member; and
   said thread formed on said pin member having a limited tapered portion relative to the longitudinal axis of said pin member to produce a controlled amount of radial interference engagement between said pin member and the box member in the threads to prevent inadvertent disengagement of said helical thread on said pin member from the corresponding thread on the box member.

8. The pin member as set forth in claim 7, wherein:
said pin member having a second helical cylindrical thread formed thereon spaced from said first helical cylindrical thread.

9. The pin member as set forth in claim 8, wherein:
said second thread having a taper portion relative to the longitudinal axis of said pin member to produce a controlled amount of radial interference between said pin member and the box member to prevent inadvertent disengagement of said first and second threads on said pin member from the corresponding threads on the box member.

10. The pin member as set forth in claim 8, wherein:
said seal surface is disposed between said first thread and said second thread.

11. The pin member as set forth in claim 7, wherein:
said seal surface is spaced sufficiently from said helical thread for pressure energization of the seal.

12. The pin member as set forth in claim 7, wherein:
said pin member is tubular.

13. A thread connector for pin and box members, including:

interengaged substantially free running radial clearance helical cylindrical threads on said pin member and said box for rotatable make-up to connect said pin member and said box member;

stop shoulders on each of said pin member and said box member disposed adjacent said interengaged helical cylindrical thread for engagement to limit rotational make-up of said pin member and said box member;

seal surfaces on each of said pin member and said box member disposed adjacent said interengaged threads for sealing radial interference engagement to block leakage of fluid between said pin member and said box member when said stop shoulders are engaged; and said interengaged threads having a limited tapered portion relative to the longitudinal axis of the interengaged threads to produce a controlled amount of radial interference engagement in the threads between said pin member and said box member to prevent inadvertent disengagement of the interengaged helical cylindrical threads.

* * * * *

Disclaimer 4,244,607.—*Thomas L. Blose*, Houston, Tex. CYLINDRICAL THREADED CONNECTION. Patent dated Jan. 13, 1981. Disclaimer filed May 28, 1981, by the assignee, *Hydril Co.*

Hereby enters this disclaimer to all claims of said patent.

[*Official Gazette August 18, 1981.*]